Oct. 12, 1937.  B. M. ALGARD  2,095,586
FILTER DEVICE FOR COMPRESSED AIR
Filed March 2, 1937
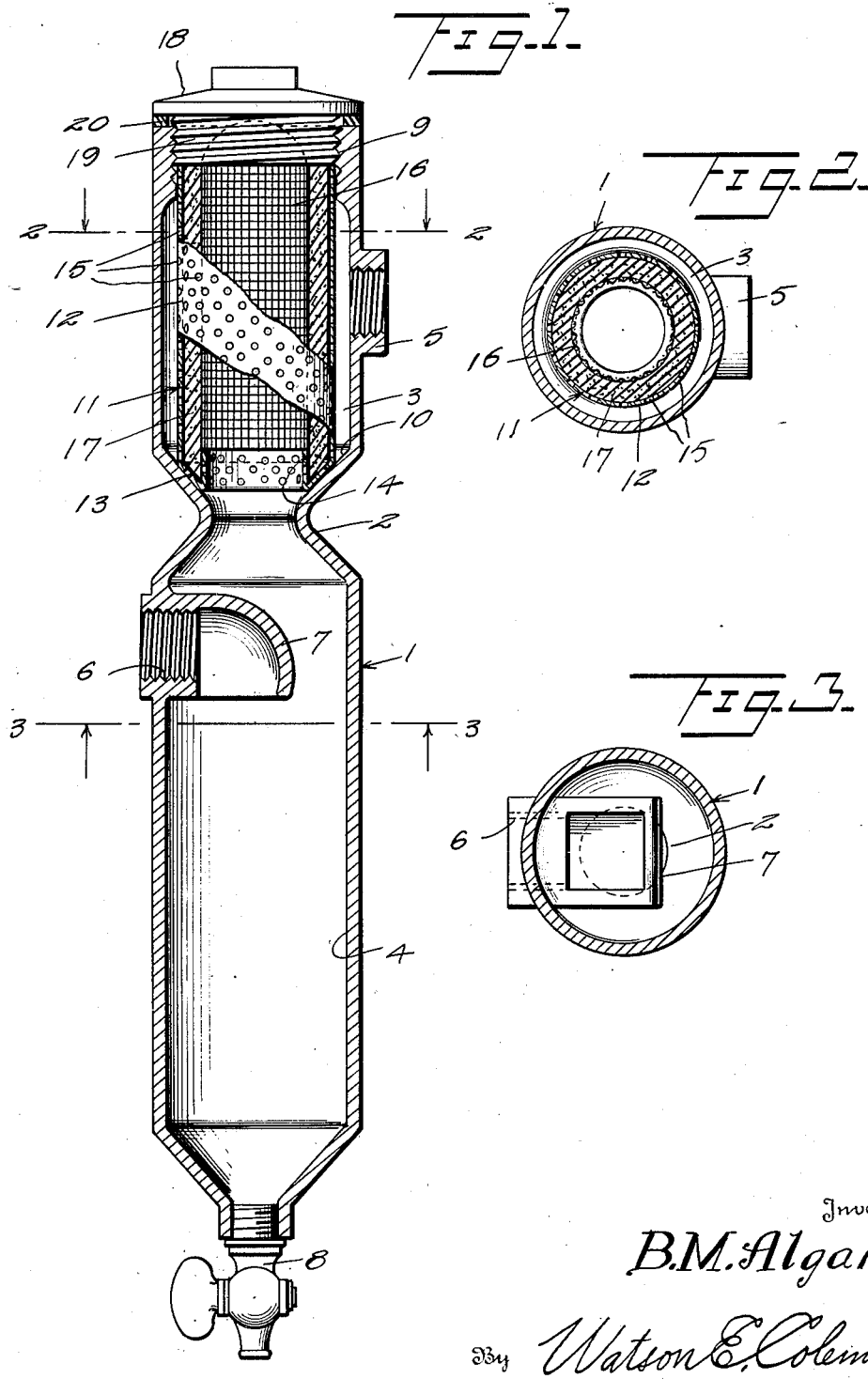
Inventor
B. M. Algard
By Watson E. Coleman
Attorney Patented Oct. 12, 1937

2,095,586

UNITED STATES PATENT OFFICE 2,095,586

FILTER DEVICE FOR COMPRESSED AIR

Bernhard M. Algard, Sheridan, Wyo.

Application March 2, 1937, Serial No. 128,675

3 Claims. (Cl. 183—48)

This invention relates to the class of filter devices and pertains particularly to an improved air filter.

The primary object of the present invention is to provide a novel type of air filter which is designed primarily for use in association with machines operated by compressed air and is intended to be disposed in the air line between the compressed air tank or other source and the machine, so that all foreign matter can be effectively removed from the air before it reaches the machine and thus prevent the moving parts of the machine from becoming damaged by grit or other particles of matter which might be carried thereinto.

Another object of the invention is to provide a novel type of air filter which is designed to be used for filtering air under high pressure and wherein novel means is employed for mounting the filtering medium in such a way that the air can be passed freely therethrough without disrupting the filtering medium and whereby the filtering medium may be easily and quickly removed for cleaning.

A still further object of the invention is to provide a filter which is so designed that it may be readily cleaned out insofar as concerns the loose particles of matter which may be intercepted as the air passes therethrough, without the necessity of disconnecting the filter structure from the air line.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a longitudinal sectional view thru a filter constructed in accordance with the present invention.

Fig. 2 is a section taken on the line 2—2 of Fig. 1.

Fig. 3 is a section taken on the line 3—3 of Fig. 1.

Referring now more particularly to the drawing, the numeral 1 generally designates the body of the filter structure which, as shown, is circumferentially constricted intermediate its ends, as indicated at 2 to thus form the two separate cylinder chambers or housings 3 and 4. The housing 3 is preferably shorter than the housing 4 and the wall of the body in the area of the housing 3 is provided with the threaded bossed opening 5 and the wall of the housing portion 4 is provided with a similar threaded opening 6 and upon the inside adjacent this opening there is formed the hood jacket 7 which is in the nature of a shield overlying the inner side of the opening 6 which is directed toward the end of the chamber 4 remote from the chamber 3. By this means the air which is introduced at the opening 6 will hit the shield 7 and be deflected toward the end of the chamber 4 away from the chamber 3, and this remote end of the chamber 4 is reduced and provided with a valved outlet unit 8 by means of which sediment may be released from this chamber 4.

The free end of the chambered portion 3 is interiorly threaded, as indicated at 9, and the formation of the constriction 2 provides the shoulder 10 at the inner end of the chamber 3 upon which rests a removable filter unit which is indicated as a whole by the numeral 11. This filter unit comprises an outer cylinder 12 which at one end is shaped to form the tapered portion 13 which is of the same angle with respect to the longitudinal axis of the cylinder as the angle of the shoulder 10 so that when the cylinder 12 is disposed within the chamber 3, the inwardly tapered portion 13 of the cylinder will rest firmly against the shoulder 10 as shown. The outer end portion of the cylinder or chamber 3 is of slightly reduced diameter, where the threads 9 are formed, so that the outer end of the cylinder 12 will fit snugly therein.

Extending inwardly from the narrower portion of the inwardly directed flange 13 of the cylinder 12 is a sleeve 14. This sleeve as well as the cylinder 12 is provided with air passing openings 15. Secured to the sleeve 14 to extend co-axially with the cylinder 12, is a wire gauze cylinder 16, and inserted in the area between the gauze cylinder 16 and the apertured outer cylinder 12 is a body of felt 17 which is in compressed condition.

Enclosing the outer end of the chamber 3 is a cap 18 which has a threaded reduced portion 19 which engages the screw threads 9, and this portion 19 bears against the outer end of the unit 11 and forces the same firmly inwardly against the shoulder 10 so as to maintain a good contact to prevent air from passing between the shoulder and the part 13 of the unit.

In use the device is vertically disposed in the compressed air line and the air is brought in through the opening 6 and flows from the chamber 4 upwardly into the gauze cylinder 16, and then through this cylinder, the felt 17, and the apertured outer cylinder 12, to the spaced area between the wall of the chamber 3 and the outer cylinder of the unit, from which it flows through the outlet 5 to the machine in association with which the filter is used. Any grit or other foreign substance entrained in the air stream will strike the baffle or hood 7 and drop to the lower end of the chamber 4. Lighter material which might be carried on will be stopped by the filtering unit. When it is desired to clean out the chamber 4 this can be done by opening the pet cock 8 and allowing the compressed air to blow out the trapped matter and when the unit 11 has gathered so much foreign material as to become ineffective, it may be readily removed by removing the cap 18 and drawing the unit outwardly so that a new unit may be inserted.

In order to prevent leakage a gasket is inserted between the cap 18 and the end of the portion 3 of the body as indicated at 20.

What is claimed is:

1. A fluid filter comprising an elongated casing having an encircling constricted portion forming two separate chambers communicating through the constricted area, a threaded outlet in the wall of one chamber, a threaded inlet in the wall of the other chamber, a cap removably secured in the end of the chamber having the outlet, a filter unit comprising an elongated cylindrical body disposed in said last chamber, said constriction forming a tapered shoulder in the end of the last chamber opposite the said cap, said filter unit having a tapered end abutting said shoulder and having said cap abutting its other end to maintain it in position on the shoulder, said unit being centrally open to receive fluid through the contricted area, drain means for the other chamber, and a hood member covering said threaded inlet to direct air entering through the inlet away from the constricted area.

2. A filter unit comprising an elongated casing body having an encircling constricted portion forming two separate chambers, said chambers being in communication through the constricted area, a threaded inlet opening for one chamber, a threaded outlet opening for the other chamber, a threaded drain means for the said one chamber, said drain means being disposed in the wall of the chamber remote from the constricted area, a hood covering said inlet opening and opening toward the drain means, a cap removably secured in the end of said other chamber, a filter unit in said other chamber comprising two concentrically related connected foraminous cylinders, and a body of felt filling the area between the same, said filter cylinders being joined at one end by a tapered wall adapted to position against the constricted end portion of the said other chamber, and said cap engaging the end of the filter unit and forcing it into position against the said constricted portion of the chamber.

3. A filter of the character described, comprising an elongated casing designed to be vertically disposed when in use, valved drain means at the lower end of the casing, removable means closing the upper end thereof, a filter support in the casing, a hollow filter body resting on said support between the same and said removable means and opening downwardly into the lower part of the casing, a discharge outlet in the wall of the area of the casing through which said filter extends, an inlet in the wall of the casing between the valved outlet and said filter support and in close proximity to the latter, and a fluid deflecting hood extending inwardly from the wall of the casing between the inlet and said support and having a portion extending across and spaced from the inlet to direct inflowing fluid toward the end of the casing remote from the filter.

BERNHARD M. ALGARD.